(12) United States Patent
Nelson et al.

(10) Patent No.: US 9,150,189 B1
(45) Date of Patent: Oct. 6, 2015

(54) AIRBAG SYSTEMS WITH SIDE VENTING

(71) Applicant: Autoliv ASP, Inc., Ogden, UT (US)

(72) Inventors: Ryan D. Nelson, Bear River City, UT (US); Jeffrey D. Williams, Roy, UT (US); Patrick Jamison, North Ogden, UT (US); Kent Potter, Brigham City, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/284,804

(22) Filed: May 22, 2014

(51) Int. Cl.
- *B60R 21/2338* (2011.01)
- *B60R 21/239* (2006.01)
- *B60R 21/276* (2006.01)

(52) U.S. Cl.
CPC ............ *B60R 21/276* (2013.01); *B60R 21/239* (2013.01); *B60R 21/2338* (2013.01); *B60R 2021/2395* (2013.01); *B60R 2021/23382* (2013.01); *B60R 2021/2765* (2013.01)

(58) Field of Classification Search
CPC ............ B60R 21/2338; B60R 21/2334; B60R 21/239; B60R 2021/23382; B60R 2021/2395
USPC ............................................. 280/743.2, 739
See application file for complete search history.

(56) References Cited

U.S. PATENT DOCUMENTS

| | | | |
|---|---|---|---|
| 7,328,915 B2 | 2/2008 | Smith et al. | |
| 7,377,546 B2 | 5/2008 | Fischer et al. | |
| 7,607,690 B2 | 10/2009 | Abe et al. | |
| 7,690,681 B2 | 4/2010 | Hall et al. | |
| 7,726,685 B2 | 6/2010 | Abe et al. | |
| 8,070,183 B2 | 12/2011 | Kumagai et al. | |
| 8,353,532 B2 | 1/2013 | Abe et al. | |
| 8,371,612 B2 | 2/2013 | Williams | |
| 8,678,431 B2 | 3/2014 | Fischer et al. | |
| 8,684,404 B2 | 4/2014 | Fischer et al. | |
| 8,696,022 B2 | 4/2014 | Fischer et al. | |
| 2004/0012179 A1* | 1/2004 | Pinsenschaum et al. | 280/739 |
| 2005/0127648 A1 | 6/2005 | Fischer et al. | |
| 2006/0071462 A1 | 4/2006 | Smith et al. | |
| 2009/0121460 A1 | 5/2009 | Abe et al. | |
| 2009/0121461 A1 | 5/2009 | Abe et al. | |
| 2010/0032931 A1 | 2/2010 | Kumagai et al. | |
| 2010/0109303 A1 | 5/2010 | Abe et al. | |
| 2011/0062693 A1 | 3/2011 | Williams | |
| 2011/0133437 A1 | 6/2011 | Jang et al. | |
| 2011/0309605 A1 | 12/2011 | Kumagai | |
| 2012/0074677 A1 | 3/2012 | Hiruta et al. | |
| 2013/0026744 A1 | 1/2013 | Fischer et al. | |

FOREIGN PATENT DOCUMENTS

FR 2757465 6/1998

* cited by examiner

*Primary Examiner* — Keith Frisby
(74) *Attorney, Agent, or Firm* — Stoel Rives LLP

(57) ABSTRACT

Airbag assemblies and active vents for airbag assemblies are disclosed. An airbag assembly may include an airbag cushion, an active vent having an aperture and a patch configured to plug the aperture, a depth-delimiting tether, a cross tether, and a control tether. The control tether may be coupled to the patch and the depth-delimiting tether. The depth-delimiting tether and the control tether may be drawn taut as the airbag cushion expands during deployment to draw the patch toward the aperture from a first position that allows unobstructed venting to a second position that obstructs venting through the aperture. The depth-delimiting tether and the control tether can be in or transition to a slack state due to occupant impact with the airbag cushion. These tethers may also be in a slack state during the early stage of deployment.

22 Claims, 12 Drawing Sheets

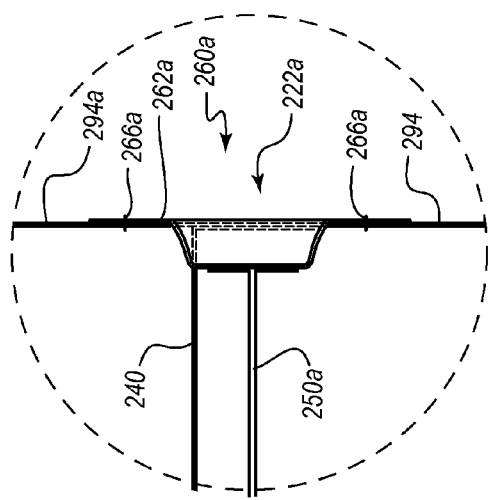
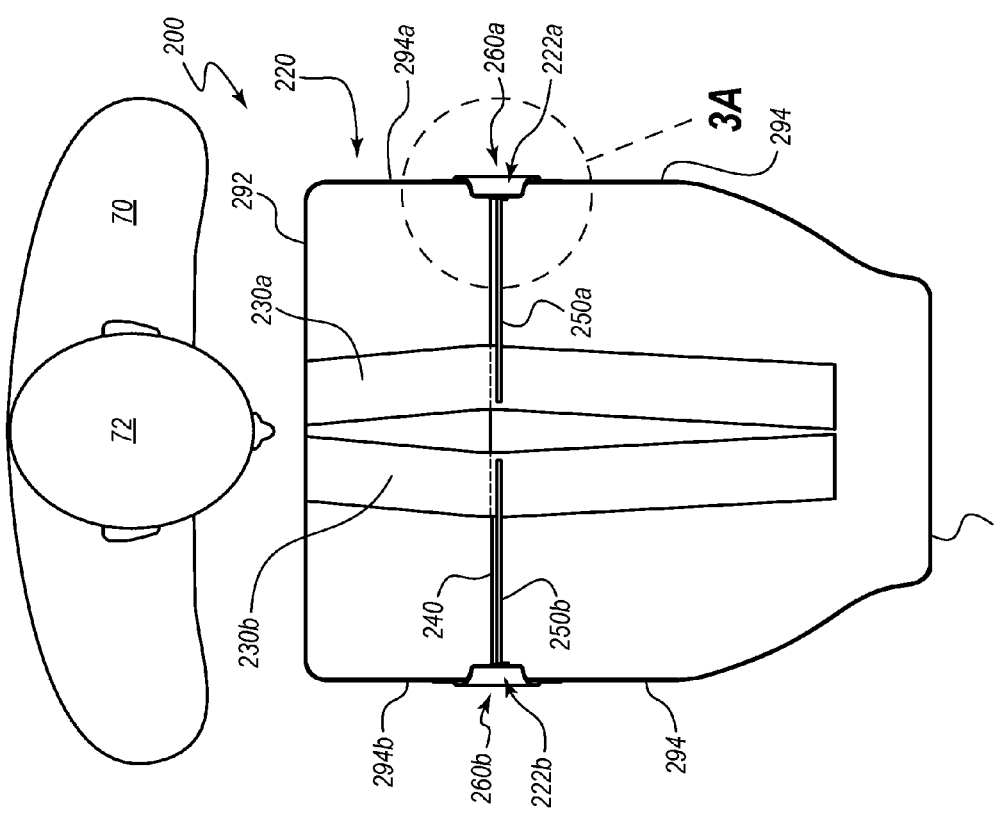

AIRBAG SYSTEMS WITH SIDE VENTING

TECHNICAL FIELD

The present disclosure relates generally to the field of automotive protective systems. More specifically, the present disclosure relates to inflatable airbag cushion assemblies.

BACKGROUND

Airbags may be mounted within a vehicle and deployed so as to prevent a vehicle occupant from impact with a vehicular structure during a collision event. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 3 is a partially cut-away top view of an airbag assembly, according to another embodiment, prior to an occupant's initial contact with the airbag assembly during a collision event.

FIG. 3A is an enlarged view of a portion of the airbag assembly as depicted in FIG. 3.

DETAILED DESCRIPTION

Figure 1A:
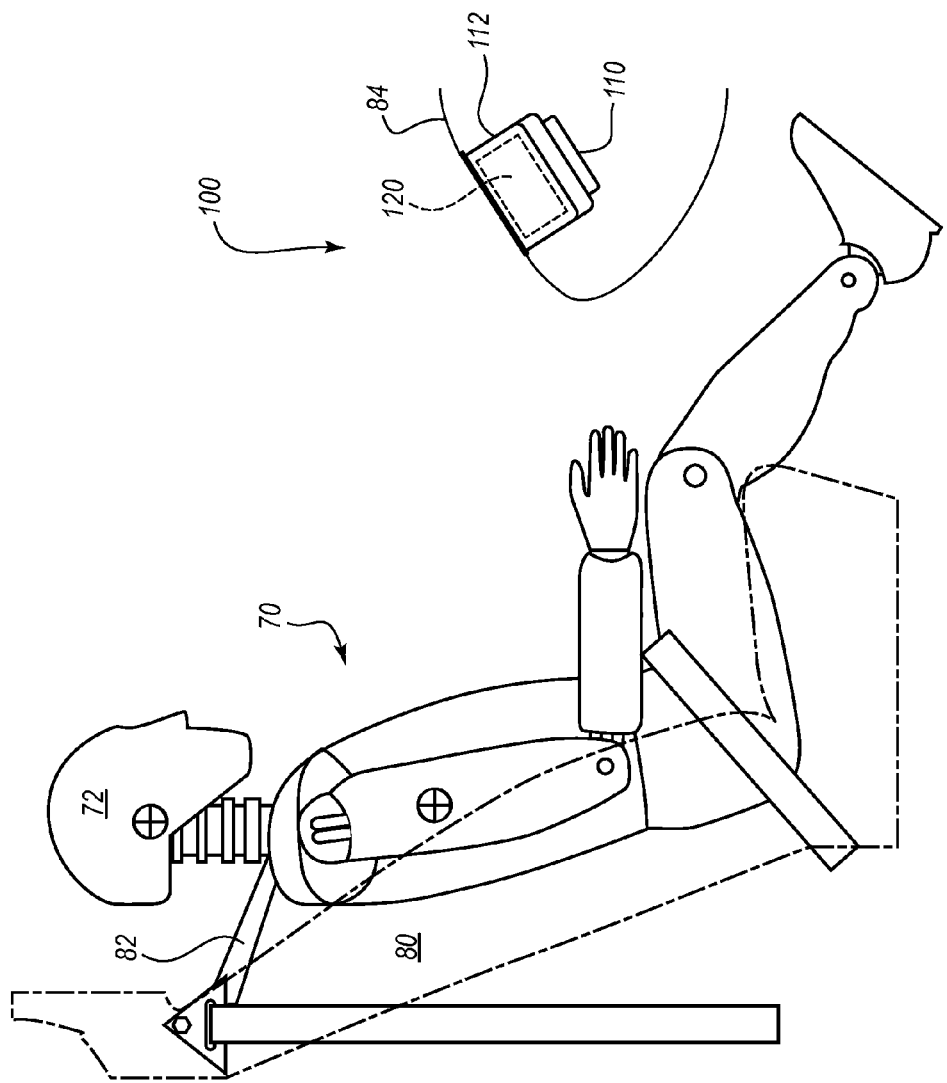
FIG. 1A is a side view of an airbag assembly disposed forward of a front-seat occupant prior to deployment of the airbag assembly.

Airbag assemblies, mechanisms for venting airbag assemblies, and other aspects of the present disclosure are described herein. As one of skill in the art with the benefit of this disclosure will appreciate, the components of the embodiments as generally described and illustrated in the figures herein may be arranged and designed in variety of different configurations. Thus, the following more detailed description of the various embodiments, as represented in the figures, is not intended to limit the scope of the present disclosure, but is merely representative of the various embodiments. For example, although specific reference is made to front airbag assemblies (and front passenger airbag assemblies in particular), the disclosed principles and features may be applied to and used with a variety of airbag deployment systems, including knee airbags, overhead airbags, curtain airbags, and the like. Thus, although an embodiment of a passenger airbag assembly is shown in the drawings, it should be recognized that the disclosure is not limited to this specific context, and the principles and features described herein may apply to airbag cushions of various shapes, sizes, and configurations.

The phrases "connected to" and "coupled to" are used in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive). The phrases "fluid communication" and "fluidly coupled" are used in their ordinary sense, and are broad enough to refer to arrangements in which a fluid (e.g., a gas and/or a liquid) can flow from one element to another element when the elements are in fluid communication with each other. The "venting capacity" of an airbag or airbag assembly refers to the degree to which potential pathways for inflation gas to exit an airbag cushion through an active vent are not obstructed (e.g., through obstruction by a patch). For example, when an airbag assembly has a relatively high venting capacity, one or more patches disposed adjacent one or more apertures of an airbag cushion may be configured in a manner that allows inflation gas to pass through the aperture(s) in a largely unobstructed fashion. Conversely, when an airbag assembly has a relatively low venting capacity, one or more patches disposed adjacent one or more apertures may more fully obstruct inflation gas from passing through the one or more apertures. Stated differently, active vents may be obstructed to a lesser degree when an airbag assembly has a relatively high venting capacity, while active vents may be obstructed to a greater degree when an airbag assembly has a relatively low venting capacity. A "front panel" of an airbag assembly refers to a panel with an outer surface that generally faces the vehicle's occupant when the airbag assembly is deployed. For example, the front panel of an airbag assembly includes an outer surface that is closer to the occupant than an inner surface of the front panel when the airbag assembly is deployed. Conversely, a "rear panel" of an airbag assembly refers to a panel with an outer surface that generally faces away from the occupant when the airbag assembly is deployed. For example, a rear panel of an airbag assembly includes an outer surface that is further from the occupant than an inner surface of the rear panel when the airbag assembly is deployed. A "side panel" of an airbag assembly may refer to other panels (e.g., top, bottom, left, and right panels) of an airbag cushion. For example, a panel with an outer surface that faces the roof of a vehicle when deployed (i.e., a top panel) may be a side panel. Additionally, the terms "left," "right," "forward," and "rearward," are used with reference to (or from the perspective of) an occupant seated across from the airbag assembly.

Inflatable airbag assemblies, modules, and/or systems may be used to reduce or minimize occupant injury during a collision event. Airbag assemblies may be installed at various locations within a vehicle, including, but not limited to, in the steering wheel, in the instrument panel, in the side doors or side seats, adjacent to the roof rail, in an overhead position, or at the knee or leg position. In the following disclosure, specific reference is made to front passenger airbag assemblies and components thereof, although the principles discussed may apply to airbags and airbag assemblies that are disposed at and/or deployable from other locations within a vehicle.

A front passenger airbag may be installed within a housing in a packaged (e.g., rolled, folded, or otherwise compressed) state and may be retained in the packaged state behind a cover. For example, a passenger airbag may be installed in an instrument panel or dashboard that is disposed in front of an occupant seated in a front passenger seat. During a collision event, an inflator may be triggered, which rapidly fills an airbag cushion with inflation gas, causing the airbag cushion to inflate and deploy through the cover. The airbag cushion may deploy toward an occupant to receive and provide restraint for the occupant during a collision event.

An airbag assembly may include one or more vents. These vents may influence the air pressure within an airbag cushion during a collision event. For example, vents that are relatively inefficient at directing inflation gas out of an airbag cushion may cause the cushion to provide relatively high initial resistance to occupants striking the airbag assembly. In other words, due to the relatively high pressure within the airbag cushion, an airbag cushion with relatively low venting capacity may exert a relatively high initial force on the occupant. Conversely, vents that allow for more efficient venting during a collision event may cause the cushion to provide less initial resistance to an occupant's forward movement. In other words, due to the relatively low pressure within the airbag cushion, an airbag cushion with high venting capacity may exert a relatively low initial force on the occupant. As disclosed herein, the venting capacity of an airbag may be modulated based on particular circumstances at the time of the collision. Stated differently, one or more vents may endow an airbag assembly with more venting capacity under some collision events than under other collision events. Additionally or alternatively, the venting capacity of an airbag may vary during a collision event due to forces that cause one or more vents to transition between one or more configurations that provide different venting capacity.

The optimal venting capacity or air pressure within an airbag cushion during a collision event depends on a number of factors. For example, it may be advantageous for an airbag cushion to have a relatively low venting capacity during some collision events and a relatively high venting capacity during other collision events. More particularly, airbags that only partially inflate during a collision event or have a relatively high venting capacity may provide better protection for and/or reduce the incidence of injury to occupants in an out-of-position ("OOP") condition. Examples of OOP conditions include collision events where a child, a baby in a rear-facing car seat, or an adult positioned too close to the airbag cushion interacts with the airbag cushion during a deployment event. Other atypical collision conditions may also fall within this category. One class of particularly relevant OOP conditions are those in which the occupant and/or car seat of the occupant strikes the airbag assembly prior to full inflation of the airbag cushion.

Certain embodiments described herein provide an airbag assembly that can respond to an occupant's position during a collision event and allow increased venting of a deployed airbag cushion to avoid excessive impact to an occupant in an OOP condition. Additionally or alternatively, certain embodiments include one or more active vents that are configured to permit increased venting during OOP conditions. Certain embodiments of the active vents can include an opening or aperture for venting gas and a patch that selectively cooperates with the aperture to either close the aperture or permit venting through the aperture. The term "active vent," as used herein, refers to a vent that transitions between two or more states or configurations. The term "active vent" does not necessarily refer to a vent that requires an input (e.g., signal) from an electronic controller or sensor to transition between states or configurations. In other words, active vents disclosed herein may transition between states or configurations without input from an electronic controller or sensor. For example, active venting may occur in conjunction with changes in the state or configuration of an airbag (e.g., changes in shape, size, etc. resulting from inflation, deflation, and/or contact with an occupant).

In some embodiments, the airbag assembly may include an active vent that is configured to transition between different venting states. For example, as an airbag assembly is deployed (e.g., under normal restraint conditions), an active vent may transition between a first venting state (e.g., a state that allows inflation gas to pass through the vent in a largely unimpeded manner), a second venting state (e.g., a state in which the passage of inflation gas through the vent is completely obstructed or obstructed to a significant degree), and a third venting state (e.g., a state in which the passage of inflation gas through the vent is obstructed to a lesser extent than when the active vent is in the second state). In some embodiments and circumstances, the third venting state may obstruct the passage of inflation gas through the vent more than the first venting state and less than the second venting state. The first venting state may be referred to as an OOP venting state, as some embodiments may remain in the first venting state throughout deployment during an OOP condition. The second venting state may be referred to as a closed venting state, closed condition, etc., as embodiments in the second venting state may prevent or substantially obstruct inflation gas from passing through the vent. The third venting state may be referred to as a restraint venting state. Vents of airbag assemblies in the third venting state may be configured to provide appropriate restraint for occupant ride-down. An airbag assembly configured to transition between these states may include an occupant tether (e.g., a depth-delimiting tether), a cross tether, and/or a control tether coupled to both the occupant tether and a patch.

By way of illustration, an airbag assembly may be in a less open state at some time points during a normal (e.g., non-OOP condition) collision event than during an OOP collision event. For example, during a normal collision event, full inflation of the airbag cushion may cause the occupant tether and the cross tether to be drawn taut. The occupant tether may be coupled to a patch. As the occupant tether is drawn taut, it may draw the patch toward the aperture and thereby obstruct airflow (venting) through the aperture. In some embodiments, the occupant tether may be coupled to the patch by a control tether. The occupant tether may, as it is drawn taut, also draw the control tether taut. When the control tether is drawn from a slack state to a taut state, the patch may be drawn toward and obstruct an aperture (e.g., vent opening) of the airbag cushion. With the aperture obstructed in this manner, inflation gas may be largely retained within the airbag cushion. Such a condition of the airbag cushion may be referred to as a restraint venting state and/or closed state.

At other times, the active vent of an airbag assembly may be in a more open state. For example, when the control tether is in a slack state during the early stages of deployment or due to an occupant's interaction with the airbag assembly, the difference between the air pressure within the airbag cushion and the air pressure of the external environment may cause inflation gas to force at least a portion of the patch away from the aperture in the airbag cushion, allowing inflation gas to pass through the aperture into the external environment.

Thus, in some embodiments, the airbag assembly may be open during early stages of airbag deployment to reduce the risk of injury to OOP occupants. In other or further embodiments, a vent of an airbag assembly may be configured to close quickly after actuation of an inflator to retain the inflation gas within the inflatable cushion. The closing of a vent in this manner may facilitate rapid and/or efficient expansion of the airbag assembly and/or provide proper restraint to a normally situated (e.g., non-OOP) occupant.

Additionally or alternatively, the selectively closeable vent may not close throughout early stages of a full airbag deployment event when the occupant is in an OOP condition; however, the vent may close during later stages of the airbag deployment event when the occupant is normally situated.

In certain embodiments, once a normally seated occupant begins to load the airbag, an active vent in a closed state may be returned to an open state to allow for desired venting that can provide desired ride-down characteristics to reduce injury. Accordingly, in various embodiments, a selectively closeable vent, or "active vent," may transition from a relatively open OOP venting state during the early stages of deployment to a relatively closed state to permit full and/or desired inflation of the airbag cushion, and then back to a restraint venting state during ride-down of a vehicle occupant after the occupant has impacted the airbag.

The same airbag may respond differently when the initial expansion of the airbag cushion is obstructed (e.g., during OOP conditions). For example, in some OOP situations, the selectively closeable vent may be open in an OOP venting state in the early stages of deployment, may remain open in the OOP venting state during intermediate stages of deployment due to early contact with a vehicle occupant in an OOP condition, and may remain open throughout the subsequent ride-down of the vehicle occupant. In other words, the selectively closeable vent may remain open throughout an entire deployment event for an OOP occupant.

Figure 1B:
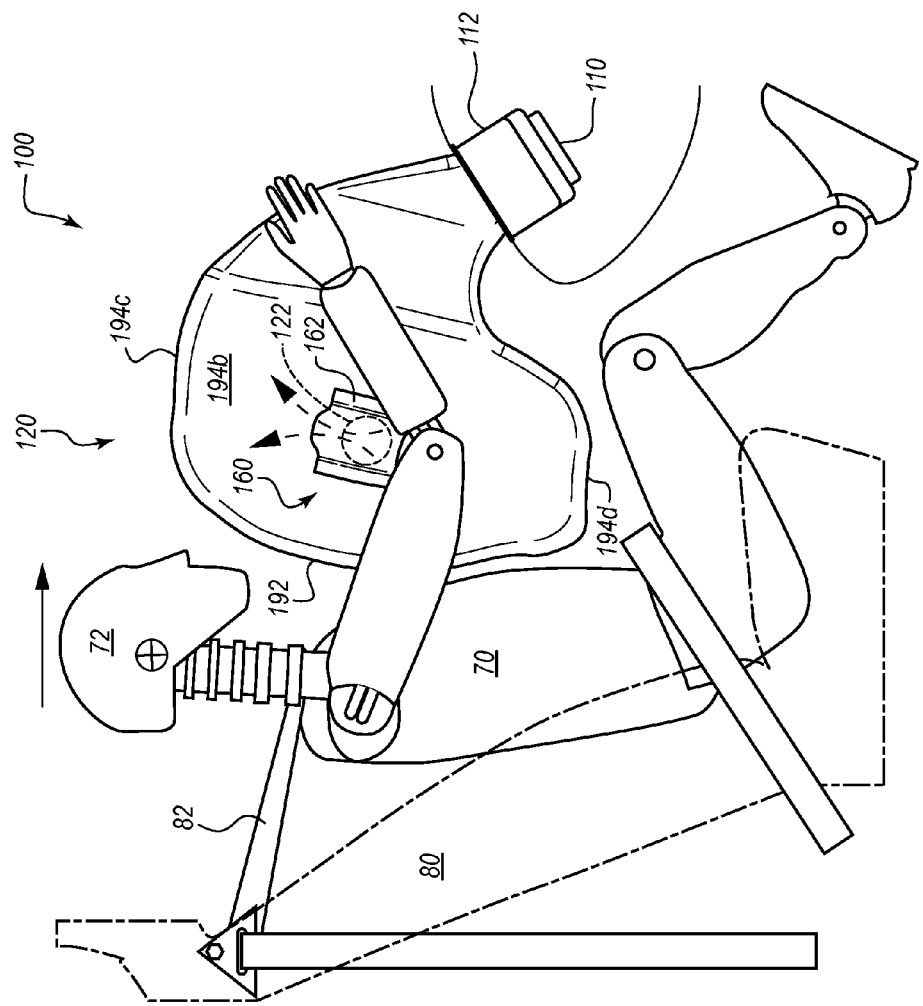
FIG. 1B is a side view of the occupant and airbag assembly of FIG. 1A at a first time point during a collision event.
Figure 1C:
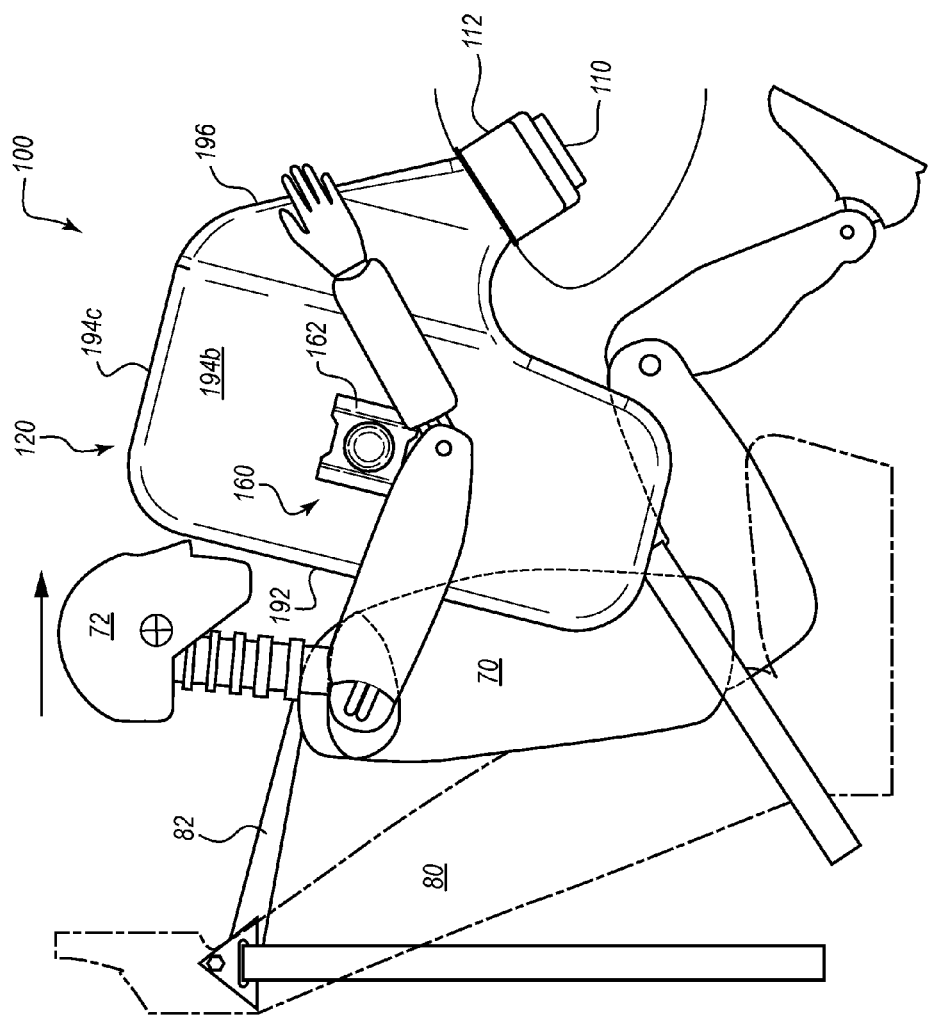
FIG. 1C is a side view of the occupant and airbag assembly of FIG. 1A at a second time point during a collision event.
Figure 1D:
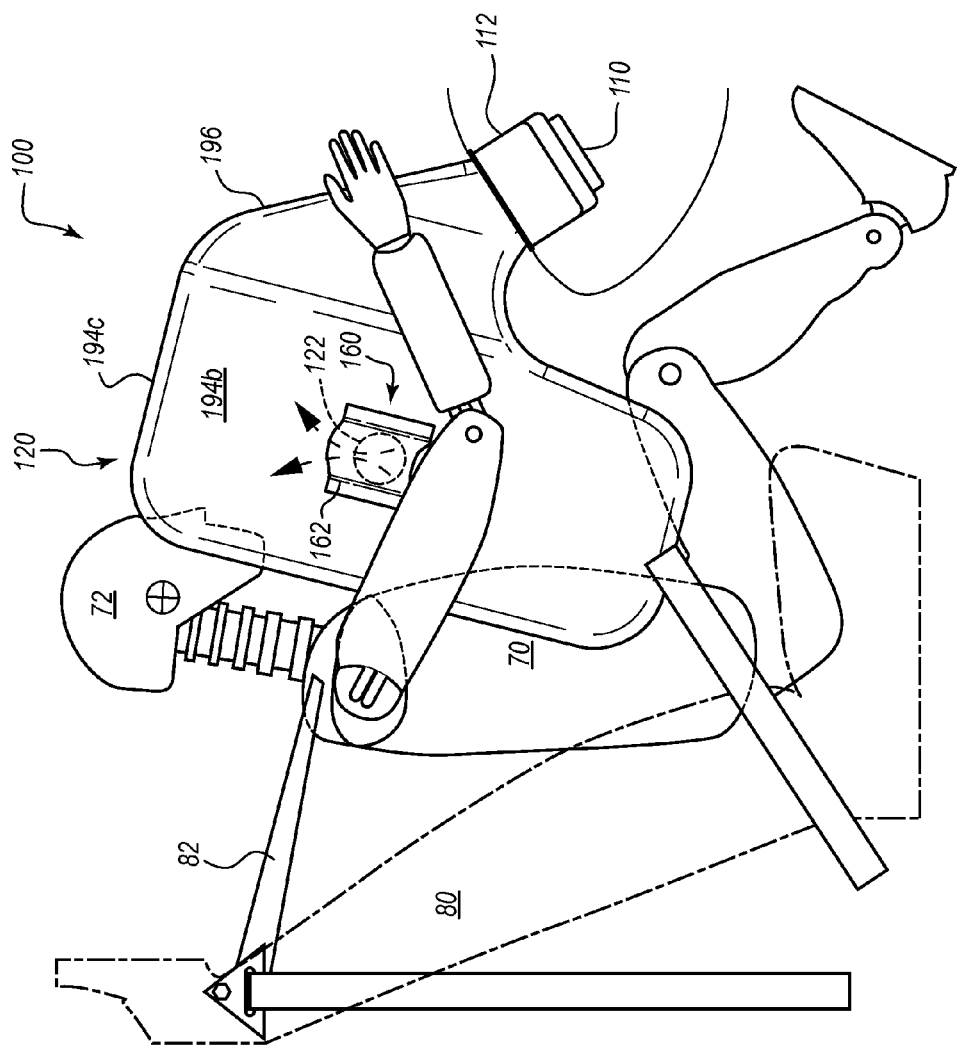
FIG. 1D is a side view of the occupant and airbag assembly of FIG. 1A at a third time point during a collision event.
Figure 2A:
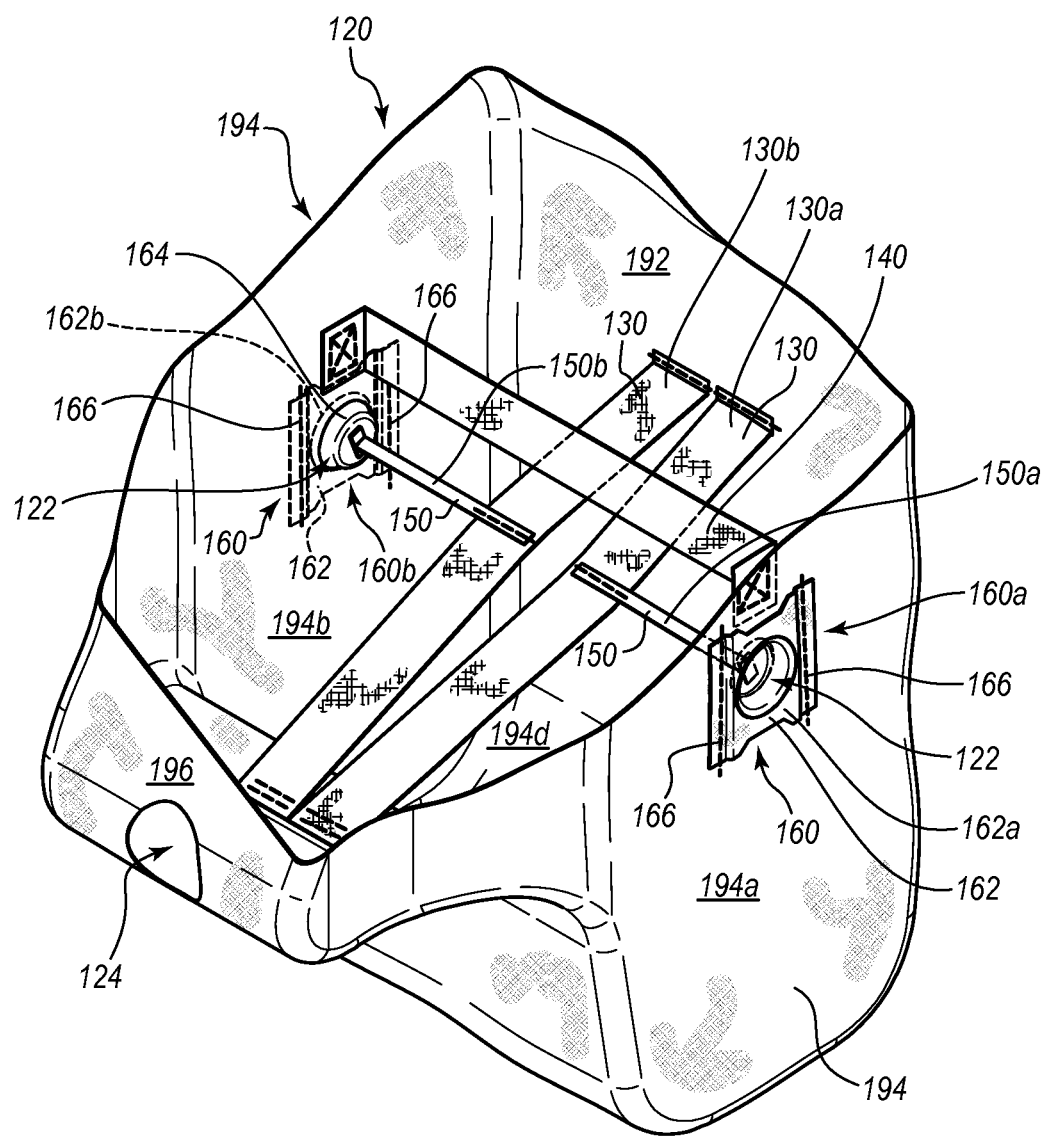
FIG. 2A is a partially cut-away perspective view of at least a portion of the airbag assembly of FIG. 1A at the second time point depicted in FIG. 1C.
Figure 2B:
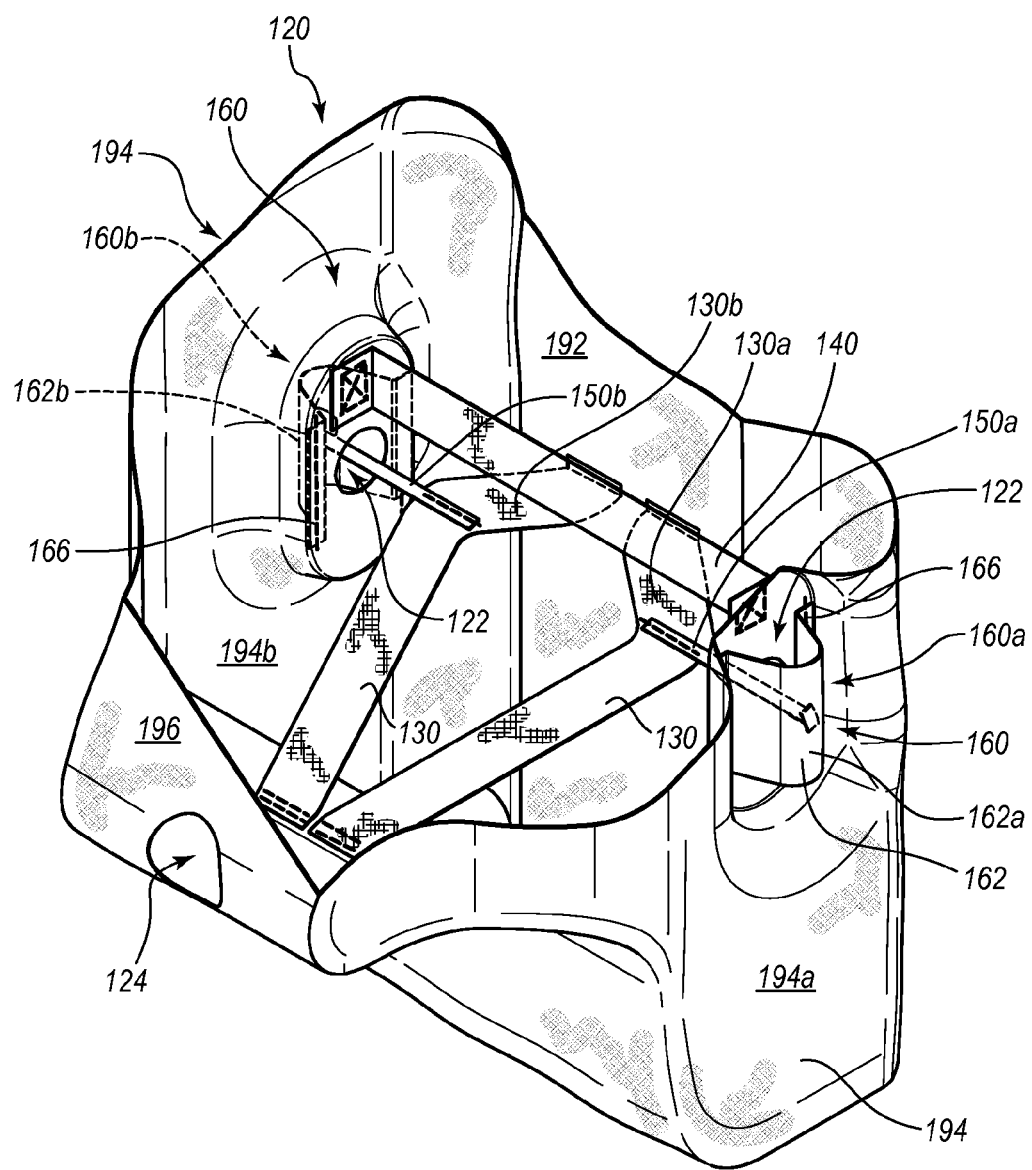
FIG. 2B is a partially cut-away perspective view of at least a portion of the airbag assembly of FIG. 1A at the third time point depicted in FIG. 1D.

FIGS. 1A, 1B, 1C, and 1D depict an occupant 70 and an airbag assembly 100 at four time points, each of which occur either prior to or during a collision event. More specifically, FIG. 1A provides a side view of an occupant 70 and an airbag assembly 100 prior to deployment of the airbag assembly 100. FIG. 1B depicts the occupant 70 and airbag assembly 100 at a first time point during deployment. FIG. 1C depicts the occupant 70 and airbag assembly 100 at a second time point subsequent to the first time point. And FIG. 1D depicts the occupant 70 and airbag assembly 100 at a third time point subsequent to the second time point. FIGS. 2A and 2B provide partially cut-away perspective views of at least portions of the airbag assembly 100 at the second time point depicted in FIG. 1C (FIG. 2A) and at the third time point depicted in FIG. 1D (FIG. 2B).

With reference to FIGS. 1A-1D, 2A, and 2B, an occupant 70 may be seated in a front seat 80 (e.g., a passenger seat) of a vehicle and restrained by a safety belt 82. In some embodiments, the occupant 70 may be seated generally rearward of an airbag housing 112 that is coupled to and disposed within a dashboard 84. In other embodiments, the airbag cushion of an airbag assembly may be disposed within the steering wheel system while the occupant is seated in the driver's seat.

The airbag assembly 100 may include an airbag cushion 120, an inflator 110, a selectively closeable discrete vent 160 (e.g., an active vent 160), an airbag housing 112, an occupant tether 130, a cross tether 140, a control tether 150 or any other suitable combination of these (or other) components. The airbag cushion 120 may be an inflatable chamber configured to receive inflation gas from the inflator 110 to expand the airbag cushion 120 from a compact state to an expanded state. For example, upon deployment, inflation gas from the inflator 110 may enter into the airbag cushion 120, causing the airbag cushion 120 to expand and exit from the dashboard 84 in a primarily rearward direction toward a front seat 80. The airbag cushion 120 may be shaped and dimensioned such that, when fully deployed, it covers a portion or region of the dashboard 84 or steering column. Deployment of the airbag assembly 110 may be triggered by one or more sensors that are coupled to the inflator 110. Triggering one or more sensors, may, at least in part, actuate the inflator 110, causing the inflator 110 to fill the airbag cushion 120 with inflation gas. In some embodiments, the inflator 110 is a single-stage inflator.

The airbag cushion 120 may include one or more panels. For example, the airbag cushion 120 may include a front panel 192, a rear panel 196, and two or more side panels 194. When the airbag assembly 100 is deployed, the front panel 192 is generally directed toward an occupant 70 or an occupant position (e.g., a front vehicle seat 80), and may at least partially define a cabin side of the airbag cushion 120. In the depicted embodiment, the rear panel 196 is located opposite the front panel 192. The rear panel 196 may be disposed adjacent to the dashboard 84 when the airbag cushion 120 is in the deployed and inflated configuration. The rear panel 196 may include and/or define an inflation aperture 124 that is configured to physically and/or fluidly couple with an inflator 110. The inflation aperture 124 may permit the entry of inflation gas into the airbag cushion 120 during a deployment event. Side panels 194 may include a left-side panel 194*a*, a right-side panel 194*b*, a top panel 194*c*, and a bottom panel 194*d*. Airbag cushion panels may be formed of any suitable material. For example, in some embodiments, panels are formed of woven nylon fabric. A variety of types and configurations of airbag panels can be utilized in various embodiments. For example, the size, shape, proportions, and connectivity of airbag cushion panels may vary in different embodiments. Further, in some embodiments, one or more panels may be seamlessly connected to one or more other panels. Airbag cushion panels may additionally be shaped, dimensioned, or otherwise tailored for use in different vehicles and/or for different locations within a vehicle.

An airbag assembly 100 may include a cross tether 140. The cross tether 140 may extend from a first side panel 194*a* to a second side panel 194*b*. For example, a cross tether 140 may have a first portion that is attached or otherwise coupled to a first panel (e.g., right side panel 194*b*) and a second portion that is attached or otherwise coupled to a second panel (e.g., left side panel 194*a*). The cross tether 140 may be coupled to side panels 194 by any suitable means. For example, a cross tether 140 may be coupled to the side panel 194 via stitching, one or more adhesives, taping, welding (e.g., radio frequency welding), heat sealing, or any other suitable technique or combination of techniques. The cross tether 140 may function as a width- or height-delimiting tether. Stated differently, the cross tether 140 may interact with the airbag cushion 120 to restrict the airbag cushion 120 along a first dimension (e.g., the airbag cushion's width or height) during deployment of the airbag assembly 100. The cross tether 140 may be formed of any suitable material, such as, for example, any of the materials discussed above with respect to the panels 192, 194, 196. In some embodiments, the cross tether 140 and panels 192, 194, 196 may be formed of the same material. In other embodiments, the cross tether 140 is formed of a material that is stiffer, thicker, less elastic, and/or stronger than the material forming the panels 192, 194, 196.

An airbag assembly 100 can also include one or more occupant tethers 130a, 130b (referenced generally as "occupant tether 130" or collectively as "occupant tethers 130"), which may be attached or otherwise coupled to panels of the airbag cushion 120. For example, an occupant tether 130 may extend from a front panel 192 to a rear panel 196 and run in a direction transverse to (e.g., generally perpendicular to) the cross tether 140. More particularly, an occupant tether 130 may have a first portion that is attached or otherwise coupled to the front panel 192 of an airbag cushion 120, and a second portion that is attached or otherwise coupled to a rear panel 196 of an airbag cushion 120. In some embodiments, a single occupant tether 130 may be strip of material that extends from a front panel 192 to a rear panel 196 and include a slit that extends longitudinally along a portion of the strip of material. The slit may effectively divide the strip into a first and second occupant tether 130a, 130b. In other words, in some embodiments, a first occupant tether 130a and a second occupant tether 130b may be integrally formed such that one strip of material with a central slit defines or otherwise forms both the first occupant tether 130a and the second occupant tether 130b.

The one or more occupant tethers 130 may be coupled to the front panel 192 and rear panel 196 by any suitable means. For example, an occupant tether 130 may be coupled to the two or more panels via stitching, one or more adhesives, taping, welding (e.g., radio frequency welding), heat sealing, or any other suitable technique or combination of techniques. The occupant tether 130 may function as a depth-delimiting tether. Stated differently, in some embodiments, the occupant tether 130 may interact with the airbag cushion 120 to restrict the airbag cushion 120 along a first dimension (e.g., the airbag cushion's depth) during deployment of the airbag assembly 100. Thus, the occupant tether 130 may assist with achieving a desired profile of the airbag cushion 120 during deployment, once the airbag cushion 120 is fully inflated, and/or during ride-down of a vehicle occupant 70 after the vehicle occupant 70 impacts the inflated airbag cushion 120. The occupant tether 130 may be formed of any suitable material, such as, for example, any of the materials discussed above with respect to the panels 192, 194, 196. In some embodiments, the occupant tether 130 and panels 192, 194, 196 may be formed of the same material. In other embodiments, the occupant tether 130 is formed of a material that is stiffer, thicker, less elastic, and/or stronger than the material forming the panels 192, 194, 196. As described below, the occupant tether 130 may couple to the active vent 160 to, during deployment, transition the active vent 160 between states that differ in the degree to which each permits or obstructs the flow of inflation gas through the vent 160. The occupant tether(s) 130 may couple to a patch 162 of an active vent 160. In some embodiments, the coupling of the occupant tether(s) 130 may be direct (e.g., the occupant tether may be stitched to the patch 162). In the illustrated airbag assembly 100 and other embodiments, the coupling of the occupant tether(s) 130 may be indirect, such as via a supplemental tether, cord, or the like.

The airbag assembly 100 can also include, for example, one or more control tethers 150a, 150b (referenced generally as "control tether 150" or collectively as "control tethers 150") (or pull cords), as shown. A control tether 150 may extend from an occupant tether 130 to an active vent 160. More particularly, a control tether 150 may have a first portion that is attached or otherwise coupled to a patch 162 of an active vent 160, and a second portion that is attached or otherwise coupled to an occupant tether 130. The control tether 150 may be disposed any suitable distance from the front panel 192 or rear panel 192 of the airbag cushion 120. For example, in some embodiments, one or more control tethers 150 are disposed close to the rear of the airbag cushion 120. In other or further embodiments, one or more control tethers 150 may be disposed close to the front of the airbag cushion 120. When the airbag assembly is deployed 100, the control tether 150 may run in a direction that is substantially parallel to and/or aligned with the cross tether 140. The control tether 150 may be coupled to the occupant tether 130 and the active vent 160 by any suitable means. For example, a control tether 150 may be coupled to these components via stitching, one or more adhesives, taping, welding (e.g., radio frequency welding), heat sealing, or any other suitable technique or combination of techniques. In some embodiments, the control tether 150 is integrally formed with the occupant tether 130 such that one piece of material includes or otherwise forms both the control tether 150 and the occupant tether 150.

As described below, the control tether 150 may interact with the active vent 160 during deployment to transition the active vent 160 between states that differ in the degree to which each permits or obstructs the flow of inflation gas through the vent 160. The control tether 150 may be formed of any suitable material, such as, for example, any of the materials discussed above with respect to the panels 192, 194, 196. In some embodiments, the control tether 150 and panels 192, 194, 196 may be formed of the same material. In other embodiments, the control tether 150 is formed of a material that is stiffer, thicker, less elastic, and/or stronger than the material forming the panels 192, 194, 196.

An airbag assembly 100 can also include one or more active vents 160. The active vents 160 may be disposed on one or more side panels 194 of an airbag cushion 120. For example, a first active vent 160a may be disposed on left-side panel 194a of an airbag assembly 100 and a second active vent 160b may be disposed on a right-side panel 194b of an airbag assembly 100. An active vent 160 of an airbag assembly 100 may include an aperture 122 defined by the airbag cushion 120 (or, more particularly, a side panel of the airbag cushion 120) and a patch 162 attached at an exterior of the airbag cushion 120 (or, more particularly, at an exterior of a side panel of the airbag cushion 120). The aperture 122 may be sized to allow venting at a rate appropriate to reduce or eliminate injury to a vehicle occupant in an OOP condition. Further, the aperture 122 may shaped in any suitable manner (e.g., circular, square, oblong, etc.).

The patch 162 may be attached to the airbag cushion 120 in any suitable manner, such as via stitching, welding, adhesives, etc. In the depicted embodiment, the patch 162 is attached using stitching such that the active vent 160 includes two seams 166 disposed on opposite sides of the aperture 122.

The patch 162 may selectively interact with the aperture 122 to selectively close the aperture 122. For example, the patch 162 may be configured to be drawn into, inverted by, or otherwise pulled into gas-stopping interaction with the aperture 122 when the occupant tether 130 and/or the control tether 150 is pulled taut due to inflation of the airbag cushion 120. However, for OOP occupants who contact the front panel 192 at an early stage of deployment, the airbag cushion 120 may never inflate by a sufficient amount to draw the occupant tether 130 and/or the control tether 150 taut, which can allow the active vent 160 to remain open.

In the illustrated embodiment, the patches 162a, 162b are attached to side panels 194a, 194b, respectively, of the airbag cushion 120. Each patch 162 may be attached to a side panel 194 at two positions, for example at positions lateral of the aperture 122. The two attachment positions may be in an arrangement that can permit the patch 162 to bow outward, away from the airbag cushion 120 and out of engagement with the aperture 122 when the active vent 160 is open. When the patch 162 is in such an open configuration, rapid venting of inflation gas out of the airbag cushion 120 may occur. In other words, two side portions of the patch 162 may be attached to a side panel 194, and a center portion of the patch 162 may be configured to be disposed a distance away from the aperture 122 when the active vent 160 is open, such that the patch 162 does not interact with the aperture 122 and permits the egress of gas through the aperture 122. Stated differently, when the active vent 160 is in an open position, the center portion of the patch 162 may be disposed at a sufficient distance from the aperture 122 so that the airbag cushion has a high venting capacity. Stated differently, when the patch 162 is bowed as described above, the patch may allow inflation gas to exit from the airbag cushion 120 through the aperture 122 in a largely unobstructed manner. When the patch 162 is disposed in this manner, due to the size of the aperture 122, the rate of venting may be appropriate for minimizing injury from airbag impact with an occupant in an OOP condition. When the patch 162 is drawn toward the aperture 122 (e.g., as the occupant tether 130 and control tether 150 are drawn taut during deployment), the patch 162 may begin to at least partially obstruct venting of inflation gas through the aperture 122. For example, the control tether 150 may draw the patch 162 toward the aperture 122, thereby preventing or decreasing the egress of inflation gas from the airbag assembly 100.

After the control tether 150 has been drawn taut during deployment, an occupant's 70 contact with a front panel 192 of the airbag cushion 120 may cause the ends of the occupant tether 130 to be disposed closer to each other. Disposing the ends of the occupant tether 130 closer to each other in this manner may allow the patch 162 to disengage from the aperture (e.g., due to air pressure inside the cushion 120 being greater than outside the cushion 120) and the vent 160 to at least partially open. For example, in the illustrated airbag assembly 100, a portion of the control tether 150 that is attached to the occupant tether 130 may move laterally toward a side panel 194. Such movement may at least partially permit opening of an active vent 160 disposed on the side panel 194. Stated otherwise, an occupant's 70 contact with the front panel 192 of an airbag cushion 120 may introduce slack into the occupant tether 130 and the control tether 150. With the control tether 150 in a slack state, inflation gas within the airbag cushion 120 may, due to the air pressure differential between the interior of the airbag cushion 120 and the vehicle cabin, push against the patch 162, thereby causing the vent 160 to at least partially open.

In the illustrated embodiment, the patch 162 is substantially rectangular and sized to engage with and plug the aperture 122. Initially, the patch 162 may be configured to be disposed in an open or OOP venting state. When the patch 162 is disposed in such a state, the airbag assembly 100 may be configured to allow venting of inflation gas at a rate appropriate to accommodate an OOP condition. As depicted in FIGS. 1B-1D, 2A, and 2B, the aperture 122 may be substantially circular, with a maximum diameter of the circle being less than a minimum width of the patch 162. The patch 162 may be configured to fully cover the aperture 122 when pulled into proximity thereto. In other or further embodiments, the patch 162 may be configured to contact the entire periphery of the aperture 122 when inverted through the aperture 122. In some embodiments, the patch 162 may be circular, triangular, oval, hourglass, or another shape. Other arrangements are also possible.

The patch 162 may be formed of any suitable material. For example, the patch 162 may be formed of the same material as that used to form one or more of the panels 192, 194, 196. The patch 162 may be coated, for example with a silicone coating, or uncoated. In some embodiments, the patch 162 may include a vent seal 164 sized similar to a diameter of the aperture 122 to provide a better seal for the active vent 160. The vent seal 164 may be disposed on an inner surface of the patch 162 and/or is formed of coated fabric sized and/or shaped to match the aperture 122. In other embodiments, the vent seal 164 may be a ring or gasket formed of silicone or other elastomeric material coupled to the patch 162.

As depicted in FIG. 1A, the airbag cushion 120 may be initially be disposed in a compact (e.g., folded) state prior to deployment and/or inflation. In this compact state, the control tether (not shown) may be in a slack condition with sufficient slack to allow the patch (not shown) to be in or otherwise tend toward an OOP venting state upon deployment. For example, when the patch is in the OOP venting state, the patch may be fully disengaged, or nearly fully disengaged, from the aperture. In other words, the slack in the control tether may be sufficient to allow the patch to be sufficiently displaced from the aperture to allow largely unobstructed egress of inflation gas through the aperture.

FIG. 1B is a side view of an embodiment of an airbag assembly 100 at a first time point during a collision event in which the airbag assembly 100 is in an early-inflation configuration. Upon deployment of the airbag assembly 100, inflation gas from an inflator 110 may pass through an inflation aperture 124 and into the airbag cushion 120, causing the airbag cushion 120 to expand. During an early stage of inflation, the airbag cushion 120 may be unfolding and/or only partially inflated. Because the one or more occupant tethers 130 and one or more control tethers 150 remain in a slack state during the early stages of inflation, the patch 162 may, for some time, remain in an OOP venting state. In other words, due to slack in the control tether 150, when the airbag assembly 100 is in an early-inflation configuration, an active vent 160 of the airbag assembly 100 may be in an open OOP venting state such that a patch 162 is positioned to permit the egress of inflation gas from the airbag cushion 120 in a largely unobstructed manner.

The initial slack in the control tether 150 may be achieved and maintained by folding or otherwise packaging the airbag cushion 120 in a number of ways. For example, the airbag cushion 120 may be initially folded to include a tuck or fold that decreases a distance between the patch 162 (and thereby the aperture 122) and the opposite end of the control tether 150 (e.g., an end secured to an occupant tether 130). Additionally or alternatively, the control tether 150 may be tack-stitched to secure the control tether 150 to a side panel 194 in a manner that puts at least a portion of the control tether 150 in a slack condition relative to the patch 162 to permit the patch 162 to be initially disposed in the OOP venting state. The tack stitch may be burst as the airbag cushion 120 expands during inflation (e.g., as the occupant tether 130 and control tether 150 are drawn taut).

In some instances, such as when the vehicle occupant is in an OOP condition, the vehicle occupant may contact the front panel 192 before the occupant tether 130 and control tether 150 have become taut and, thus, before the patch 162 has closed the venting aperture 122. As a result, the occupant tether 130 and control tether 150 may remain relatively slack, the active vent 160 may remain open, and inflation gas can exit through the aperture 122. In certain instances, the active vent 160 may never close during an OOP collision event. Such venting at earlier (and, in some instances, all) stages of OOP conditions may reduce injury to the OOP occupant.

FIG. 1C provides a side view of an embodiment of an airbag assembly 100 at a second time point during a non-OOP collision event in which the airbag assembly 100 has transitioned from the OOP venting state to a closed venting state. FIG. 2A provides a partially cut-away perspective view of the airbag assembly 100 at the same second time point. As depicted in these figures, at the second time point, due to full inflation of the airbag cushion 120, the active vent 160 is in a closed state and the patch 162 limits or prevents egress of inflation gas from the airbag cushion 120.

During a non-OOP collision event, once a degree of inflation of the airbag cushion 120 is achieved, the active vent 160 may transition from a first venting state (e.g., an OOP venting state such as that shown in FIGS. 1A and 1B) to a second venting state (e.g., a closed venting state such as that shown in FIG. 1C). For example, during deployment, the occupant tether 130 may be drawn taut as the airbag cushion 120 expands, thereby causing the control tether 150 to be drawn taut as well and pulling the patch 162 toward the aperture 122. Drawing the patch 162 toward the aperture 122 in this manner may completely or partially obstruct the venting of inflation gas through the aperture 122 and transition the airbag assembly 100 out of the OOP venting state. This transition out of the OOP venting state may be permanent, such that through deployment, restraint, and/or ride-down, the active vent 160 is limited to transitions between the restraint venting state and the closed venting state.

Stated differently, if a vehicle occupant 70 does not contact the airbag cushion 120 during an early stage of airbag deployment, the airbag cushion 120 may continue to expand in the general direction of the normally seated occupant 70. As this expansion occurs, the occupant tether 130 tightens to a taut condition. As the occupant tether 130 transitions to the tightened condition, a control tether 150 that is coupled to both the occupant tether 130 and the patch 162 becomes taut as well. In other words, as the occupant tether 130 is drawn taut, the control tether 150 may be drawn toward the center of the airbag cushion 120, thereby pulling the patch 162 toward the aperture 122 and obstructing the vent 160.

The tightening of the control tether 150 to the taut condition can also pull a portion of the patch 162 through (e.g., internally relative to) the aperture 122 to prevent the leakage of inflation during normal restraint conditions. The vent seal 164 of the patch 162 may engage the perimeter of the aperture 122. Stated otherwise, the control tether 150 that is attached to the patch 162 can become taut, which can invert the patch 162 through the aperture 122 and thereby plug or seal the aperture 122 or otherwise close the active vent 160. The plugging may prevent or inhibit egress of the inflation gas through the aperture 122.

FIG. 1D provides a side view of the airbag assembly 100 at a third time point during a collision event. FIG. 2B provides a partially cut-away perspective view of the airbag assembly 100 at this same (or similar) third time point. At the depicted third time point, the occupant 70 has struck the airbag cushion 120, thereby forcing the front panel 192 in a rearward direction. When the front panel 192 is pushed in a rearward direction as shown, the active vent 160 may transition from a closed state to a restraint venting state. This transition from a closed configuration to the restraint venting state may permit egress of inflation gas from the airbag cushion 120 at a rate appropriate for safe occupant ride-down.

More specifically, the control tether 150 may remain in the taut condition as shown in FIG. 2A until loading by the normally seated vehicle occupant 70 occurs. Upon such loading, the front panel 192 of the airbag cushion 120 is pushed in a forward direction (e.g., toward the dashboard 84). This movement of the front panel 192 may cause the ends of occupant tether 130 to draw nearer to one another and/or introduce slack into the occupant tether. With the occupant tether 130 is a slack state, the control tether 150 may also become slack, thereby allowing the patch 162 to be forced from the inverted orientation, invert in the opposite direction, and/or otherwise be forced back through or out of the aperture 122 to the exterior of the airbag cushion 120, such as is shown in FIG. 2B. In other words, due to the slackening of the control tether 150, inflation gas within the airbag cushion 120 may push the patch 162 away from the aperture 122 to allow increased venting relative to the closed state. This increased venting may be referred to as the restraint venting state as the rate of venting during the restraint venting state may be appropriate for occupant ride-down.

The opening of a vent 160 due to occupant's 70 contact with the front panel 192 of the airbag cushion 120 may be facilitated by the cross tether 140. For example, as an occupant 70 strikes the airbag cushion 120 (e.g., with the occupant's head 72), the cross tether 140 may remain taut, restricting a length of the airbag cushion 120 along a first dimension (e.g., the width of the airbag cushion). During this same time period, the occupant's 70 contact with the front panel 192 may cause the occupant tether 130 and control tether 150 to become slack. Due to both slack in the control tether 150 and the difference in air pressure between the interior of the airbag cushion 120 and the external environment, inflation gas within the airbag cushion 120 may push against the patch 162 while the side panels 194 and aperture 122 are held in place by the cross tether 140, causing a portion of the patch 162 to move away from the aperture 122. Such movement of a portion of the patch 162 away from the aperture 122 may allow egress of inflation gas from the airbag cushion 120. In contrast, in an embodiment similar to the depicted embodiment, but lacking a cross tether, as the occupant strikes the front panel of the airbag cushion, the side panel (and thus the aperture) may move in a lateral direction further than the side panel would move if the airbag assembly included a cross tether. Such lateral movement may prevent the patch from separating from the aperture (or decrease the distance and/or speed of separation between the patch and the aperture). In other words, in embodiments lacking the cross tether, the vent may not open to the same degree or as quickly as it would if the embodiment included a cross tether.

While the embodiment depicted in FIGS. 1A-1D, 2A, and 2B includes active vents 160a, 160b on only a left-side panel 194a and a right-side panel 194b, other embodiments may include active vents on a top panel 194c and/or a bottom panel 194d. For example, in some embodiments, active vents may be disposed on a top panel and bottom panel, with a cross tether that extends from the top panel to the bottom panel. In these embodiments, as occupant tethers become slack due to an occupant's contact with the front panel of the airbag during a collision event, the control tethers (which extend from the occupant tethers to the vents) may become slack as well, allowing inflation gas to push the patches of the vents away from the apertures disposed on the top and bottom panels.

Figure 4A:
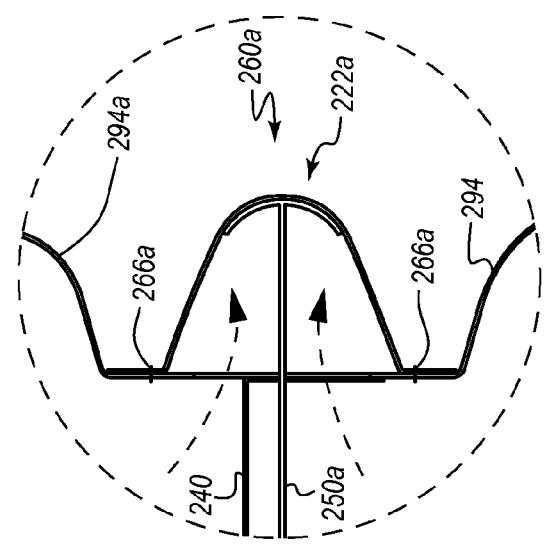
FIG. 4A is an enlarged view of a portion of the airbag assembly as depicted in FIG. 4.
Figure 4:
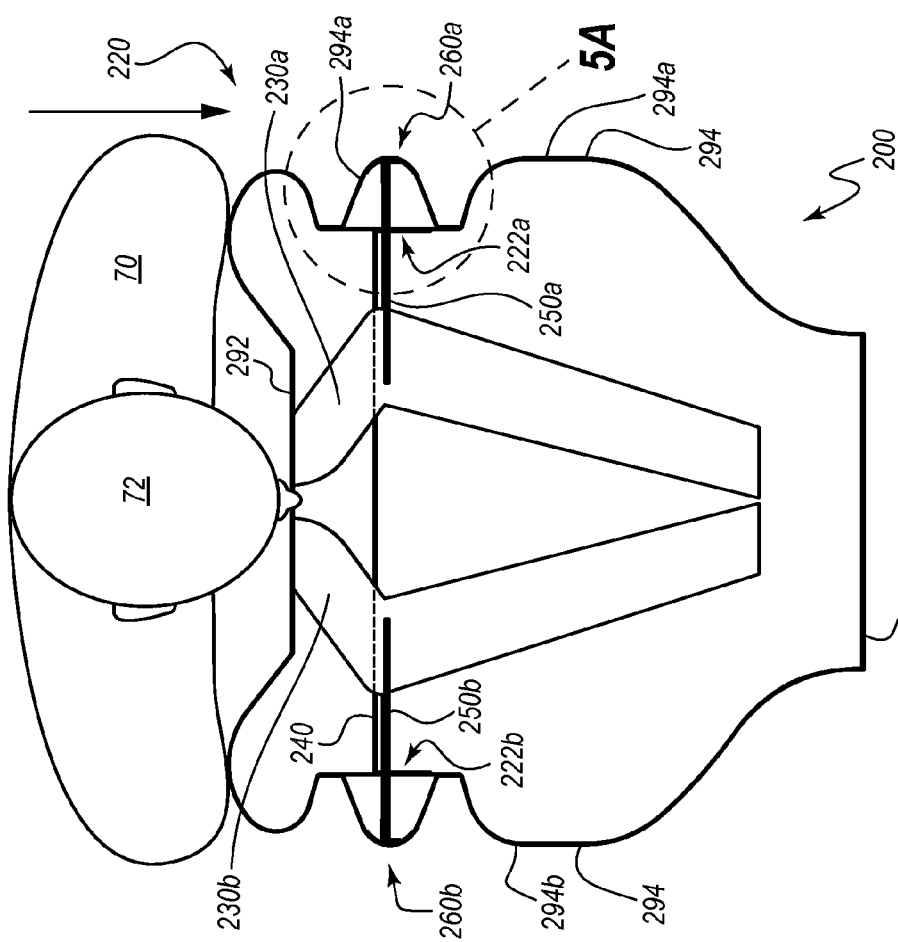
FIG. 4 is a partially cut-away top view of the airbag assembly of FIG. 3 after an occupant has initially contacted the airbag assembly during a collision event.

FIGS. 3 and 4 depict a cut-away top view of an airbag assembly 200. More particularly, FIG. 3 depicts the airbag assembly 200 in a closed venting state, and FIG. 3A provides an enlarged view of the vent 260a of the airbag assembly 200. FIG. 4 depicts the airbag assembly 200 in a restraint venting state, and FIG. 4A provides an enlarged view of the vent 260a of the airbag assembly 200. The airbag assembly 200 depicted in FIGS. 3 and 4 resembles the airbag assembly 100 described above in certain respects. Accordingly, like features are designated with like reference numerals, with the leading digits incremented to "2." For example, the embodiment depicted in FIGS. 3 and 4 includes an airbag cushion 220 that may, in some respects, resemble the airbag cushion 120 of FIGS. 1A-1D, 2A, and 2B. Relevant disclosure set forth above regarding similarly identified features thus may not be repeated hereafter. Moreover, specific features of airbag assemblies and related components shown in FIGS. 1A-1D, 2A, and 2B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200 and related components depicted in FIGS. 3 and 4. Any suitable combination of the features, and variations of the same, described with respect to the airbag assembly 100 and related components illustrated in FIGS. 1A-1D, 2A, and 2B, can be employed with the airbag assembly 200 and related components of FIGS. 3 and 4, and vice versa.

Referring generally and collectively to FIGS. 3, 3A, 4 and 4A, the airbag assembly 200 can include an airbag cushion 220 that includes a front panel 292, a rear panel 296, and side panels 294. One or more active vents 260a, 260b may be disposed on one or more side panels 294a, 294b. One or more active vents 260a, 260b may include a patch 262a, 262b, or a similar plug, that is configured to selectively interact with an aperture, such as left aperture 222a, to close the aperture. A vent patch 262a may be attached to the airbag cushion 220. The patch 262a may be similar to, and interact with the aperture 222a similarly to, the embodiment shown in FIGS. 1A-1D, 2A, and 2B, as described above. In certain embodiments, one or more vents 260a, 260b and/or apertures (e.g., 222a) are sized to allow venting at a rate appropriate for an OOP condition when the vent 260 is in the OOP venting state.

The airbag assembly 200 can include occupant tethers 230a, 230b that extend from the front panel 292 to the rear panel 296 of an airbag cushion 220. The airbag assembly 200 can also include a first control tether 250a that is coupled to a first active vent 260a and a first occupant tether 230a. The airbag assembly 200 can also include a second control tether 250b that is coupled to a second active vent 260b and a second occupant tether 230b. The occupants tethers 230a and 230b may be disposed at the same (or similar) vertical height. In other words, the occupant tethers 230a and 230b may be horizontally aligned. The airbag assembly 200 can also include a cross tether 240 that extends from a first side panel 294a to a second side panel 294b. In contrast to the cross tether 140 of airbag assembly 100, the cross tether 240 of airbag assembly 200 is disposed below the occupant tethers 230a, 230b and the control tethers 250a, 250b.

Operation of the airbag assembly 200 can proceed similarly to the airbag assembly 100 described above. For example, in some embodiments, the active vents 260 may be initially open because the occupant tethers 230a, 230b and control tethers 250a, 250b are in a slack condition. If a vehicle occupant 70 does not contact the airbag cushion 220 during the early stages of airbag deployment, the airbag cushion 220 may expand in the general direction of the normally seated occupant 70. As this expansion occurs, the occupant tethers 230a, 230b are drawn to a taut condition. As the occupant tethers 230a, 230b are drawn taut, the control tethers 250a, 250b may, in turn, be drawn taut. The control tethers 250a, 250b may draw the patches (e.g., patch 262a) from the OOP venting state (not shown) to the closed venting state (as shown in FIGS. 3 and 3A).

For example, expansion of the airbag assembly 200 may cause a control tethers 250a to pull a portion of a patch 262a through (e.g., internally relative to) the aperture 222a to prevent gas leakage during non-OOP collisions. The control tether 250a that is attached to the patch 262a can be pulled taut during the course of inflation of the airbag cushion 220 by the occupant tether 230a. The drawing of the control tether 250a to a taut condition can invert the patch 262a through the aperture 222a and thereby plug the aperture 222a or otherwise close the active vent 260a. The plugging of the aperture 222a may prevent or inhibit egress of the inflation gas through the aperture 222a. Due to plugging of the aperture 222a by the patch 262a, the airbag cushion 220 may reach a full inflation state (e.g., the state shown in FIG. 3).

A control tether 250a may remain in the taut condition until loading by the normally seated vehicle occupant 70 occurs. Upon such loading, the front panel 292 of the cushion 220 can collapse with the ride-down of the occupant 70. This translation of the front panel 292 toward the rear panel 296 can allow the occupant tether 230a to slacken again, which in turn can allow the control tether 250a to return to a slack state. The return of the control tether 250a to a slack state can allow the patch 262a to be forced from the inverted orientation (e.g., invert again in the opposite direction) and/or otherwise be forced back through or out of the aperture 222a to the exterior of the airbag cushion 220, as shown in FIGS. 4 and 4A. Inflation gas may thus pass through the venting aperture 222a. Such movement of the patch 262a may allow for restraint venting of the airbag assembly 200. As can be appreciated from the foregoing, in various embodiments, the active vent 260a can be activated (e.g., opened from a closed position) by displacement of the front panel 292.

In other instances (not shown), such as when the vehicle occupant is in an OOP condition, the vehicle occupant may contact the front panel 292 before one or more control tethers 250a, 250b have become taut and, thus, before the patches 262a, 262b have closed the venting apertures 222a, 222b. As a result, the control tethers 250a, 250b may remain relatively slack, the active vents 260a, 260b may remain open, and inflation gas can exit through the apertures (e.g., aperture 222a). Such venting at earlier (and, in some instances, all) stages of OOP conditions can reduce injury to the OOP occupant.

Figure 5:
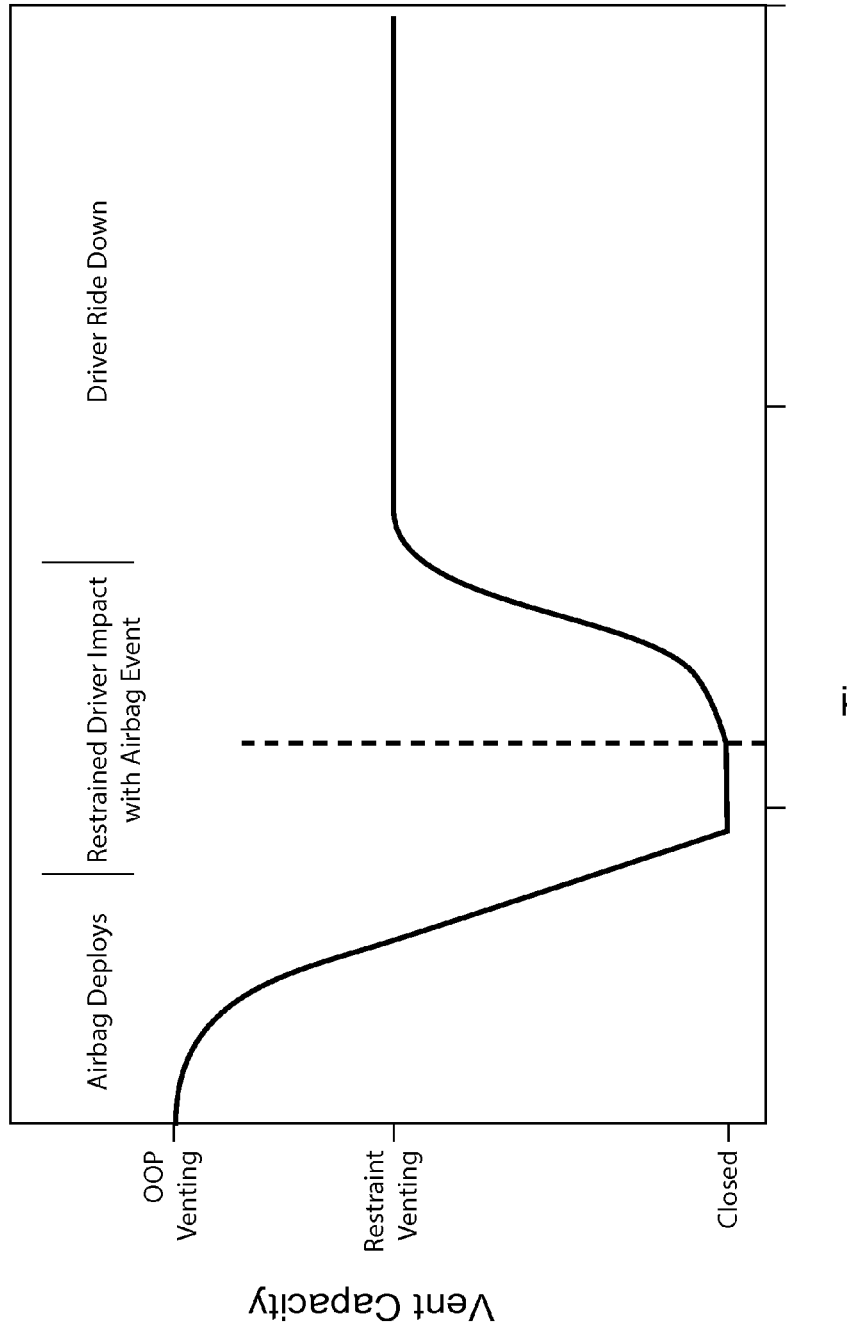
FIG. 5 is a graph showing venting capacity of an active vent, according to one embodiment, as a function of time.

FIG. 5 is a graph showing venting capacity of an active vent, according to one embodiment, as a function of time. The graph illustrates that initially, such as when the airbag cushion is still in a collapsed or packaged configuration, the active vent may be at a maximum venting capacity, such as an OOP venting capacity, because the active vent is in the OOP venting state. Shortly after initiation of deployment, the airbag cushion begins to expand (assuming an OOP condition is not present that would prevent expansion and maintain the active vent in the OOP venting state). Expansion of the airbag cushion may draw taut an occupant tether and a control tether (or otherwise reduce slack on the occupant tether and the control tether). Such expansion of the airbag cushion may, in turn, transition the active vent to the closed state. In the closed state, the venting capacity of the active vent may completely prevent or largely obstruct the flow of inflation gas from the airbag cushion into the external environment. An occupant's subsequent impact on the airbag cushion may result in slack on both the occupant tether and the control tether, allowing the active vent to open to some extent. Allowing the active vent to open slightly may allow the gradual egress of inflation gas from the airbag cushion and in turn transition the active vent to the restraint venting state. When the active vent is in the restraint venting state, the venting capacity of the airbag assembly may be appropriate for occupant ride-down. As can be appreciated, the graph of FIG. 5 may be an approximation to illustrate timing of the three distinct states of an active vent: OOP venting state, restraint venting state, and closed state. A graph corresponding to an actual embodiment may differ from the graph of FIG. 5.

Figure 6A:
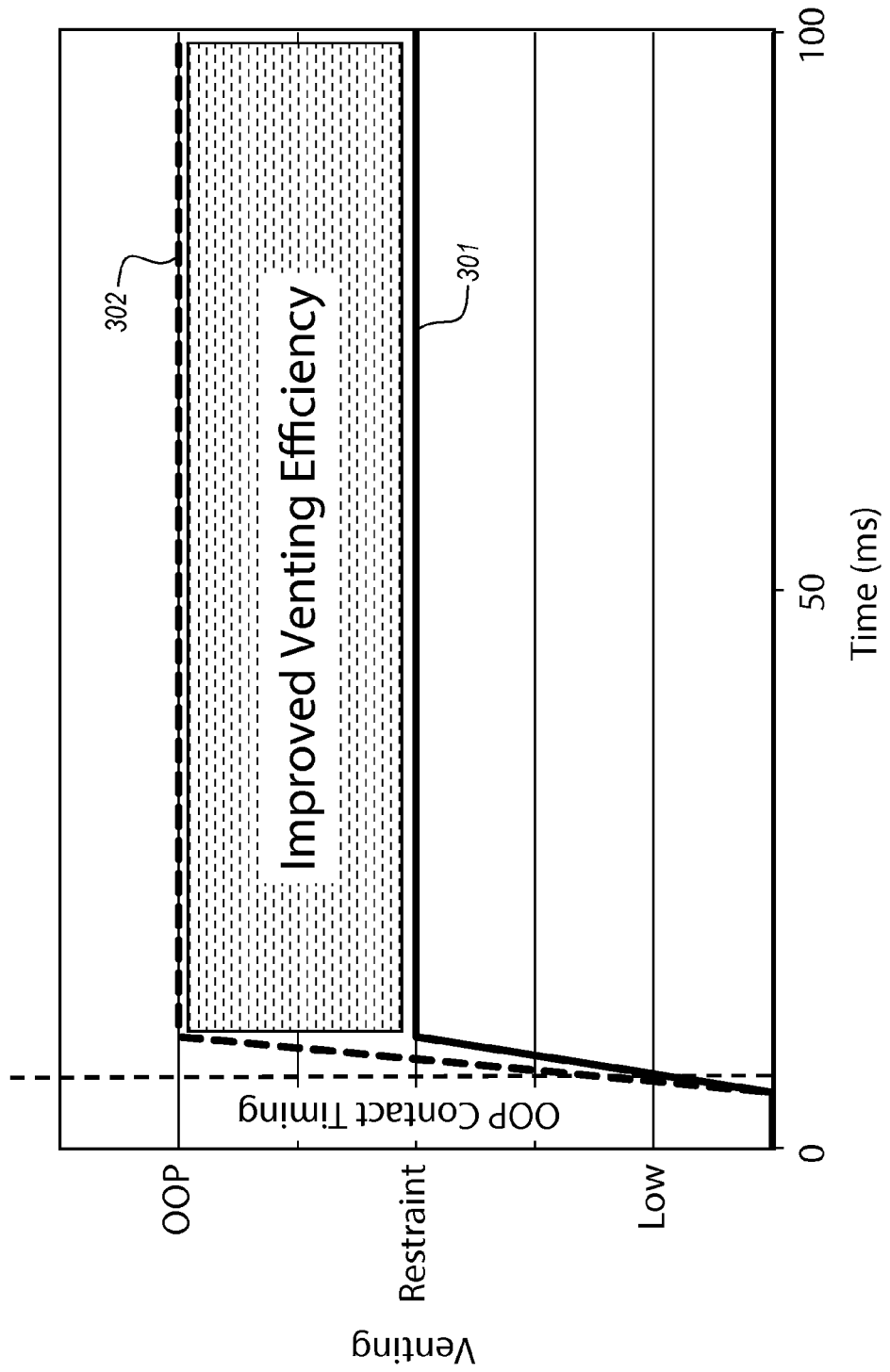
FIG. 6A is a graph illustrating venting rate as a function of time during an early load case for both a standard airbag assembly and an airbag assembly according to the present disclosure.

FIG. 6A is a graph illustrating the rate of venting as a function of time during an OOP load case condition for both a standard-design airbag assembly with a typical discrete vent (represented by solid line 301) and an airbag assembly with an active vent according to the present disclosure (represented by broken line 302). An active vent, such as described in the foregoing embodiments, can provide a larger venting aperture (e.g., an aperture appropriate to vent inflation gas quickly enough to avoid vehicle occupant injury from the expanding airbag when the vehicle occupant is in an OOP condition). The larger aperture provides venting of inflation gas at an appropriate OOP venting rate, which may be approximately two-thirds faster than a venting rate of a typical discrete valve of a standard-design airbag assembly.

Without an active valve, an airbag assembly according to a standard design typically includes discrete vents designed to vent at a rate appropriate for restraint of the occupant, as indicated by line 301. The rate appropriate for restraint is typically less than an OOP venting rate. The faster OOP venting rate helps reduce impact of the airbag (and possibly injury from such impact) to a vehicle occupant in an OOP condition. The graph of FIG. 6A illustrates improved venting efficiency for an OOP condition deployment. The active vent allows for a larger venting capacity (OOP venting rate) in the OOP venting state while also enabling a restraint venting state for appropriate occupant ride-down when an OOP condition is not present.

Figure 6B:
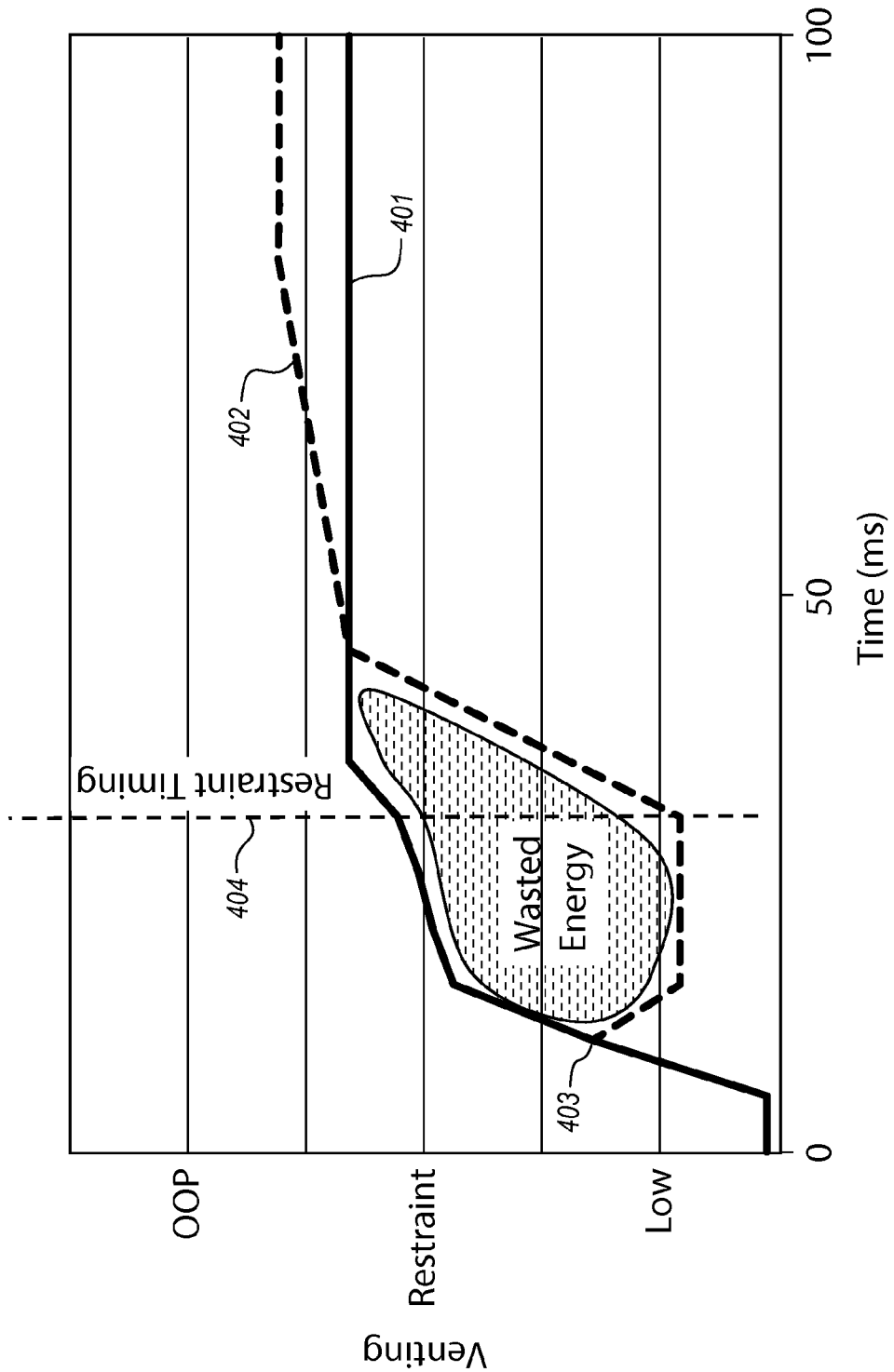
FIG. 6B is a graph illustrating venting rate as a function of time during an typical load case for both a standard airbag assembly and an airbag assembly according to the present disclosure.

FIG. 6B is a graph illustrating venting rate as a function of time during a normal restraint load case for both a standard-design airbag assembly (indicated by solid line 401) and an airbag assembly with an active vent according to the present disclosure (indicated by broken line 402). In a standard design, the discrete vent may be always open so venting increases as the airbag inflates until a maximum venting rate is achieved. The maximum venting rate may be limited by the size of the discrete vent. Further, the size of the discrete vent may be selected to provide a rate of venting that is appropriate to restrain an occupant during ride-down.

An airbag assembly with an active vent may provide a rate of venting that differs from that provided by embodiments that lack active vents as disclosed herein. For example, as illustrated by the graph, once an active vent closes (at point 403), venting is low (i.e., inflation gas is largely retained) until the airbag cushion encounters a restraint load (at line 404), such as may be caused by an occupant striking the airbag cushion. When the occupant strikes the airbag cushion, the venting rate may increase. Embodiments including one or more active vents may use less gas and/or energy than embodiments lacking such vents. For example, the graph illustrates energy or gas wasted by a standard design relative to a design with one or more active vents. The wasted energy is expended to maintain inflation of the airbag at a level to provide sufficient restraint of an occupant. Wasted gas is inflation gas that is lost through a vent before occupant restraint and does not contribute to occupant restraint. The active vent retains the inflation gas until venting is needed, and is thus more efficient with the input energy from the inflator. In short, embodiments including active vents such as those described here may require less input energy to counteract the forward movement of an occupant during a collision event. Thus, embodiments having such active vents may allow for the use of smaller inflators.

Figure 6C:
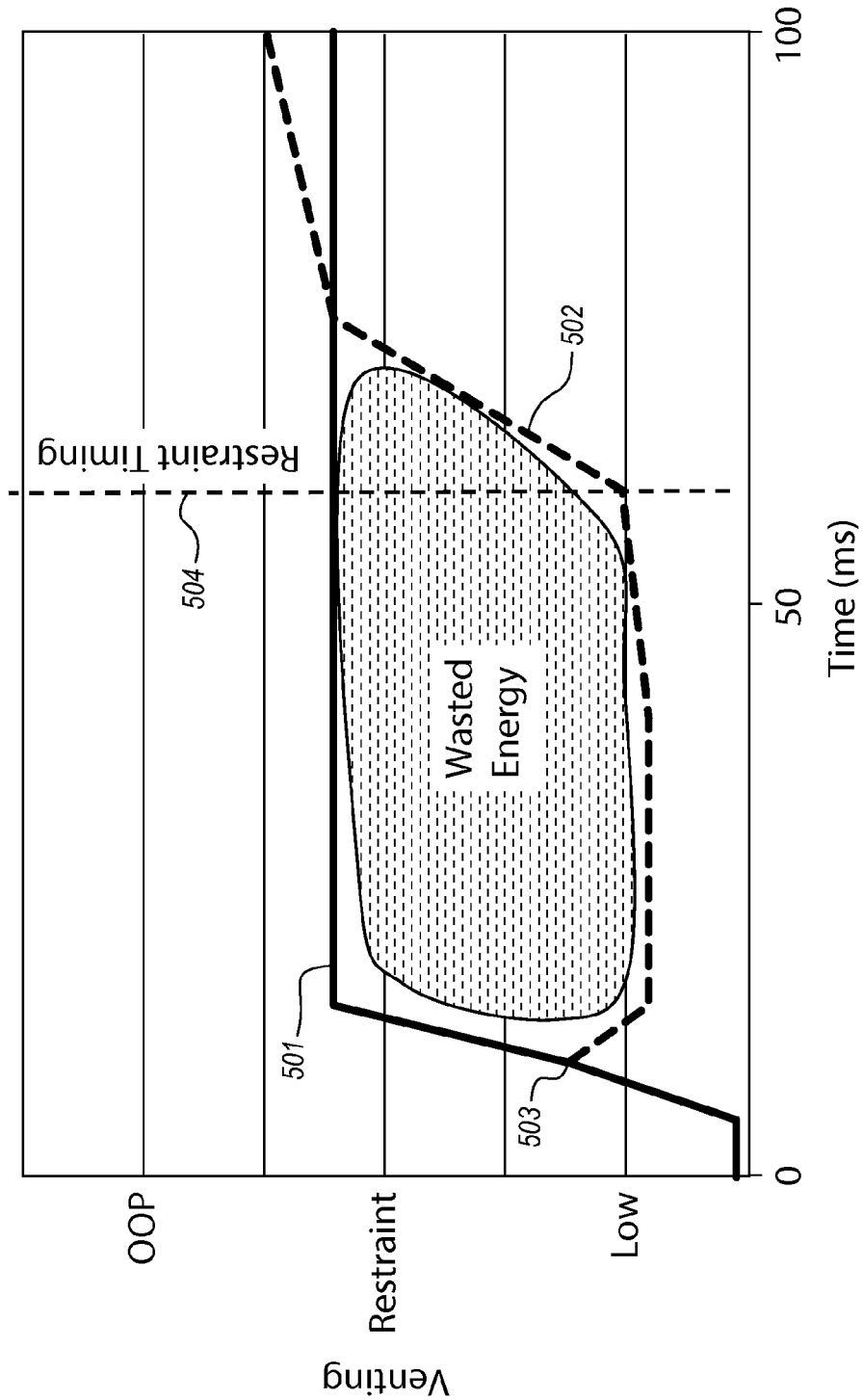
FIG. 6C is a graph illustrating venting rate as a function of time during a long duration load case for both a standard airbag assembly and an airbag assembly according to the present disclosure.

FIG. 6C is a graph illustrating the rate of venting as a function of time during a long duration load case for both a standard-design airbag assembly (indicated by solid line 501) and an airbag assembly with an active vent according to the present disclosure (indicated by broken line 502). In a standard design, the discrete vent may be always open so venting gradually increases as the airbag inflates until a maximum venting rate is achieved, the maximum being limited by the size of the discrete vent. The discrete vent may be sized to provide appropriate restraint during occupant ride-down.

As illustrated by the graph, an airbag assembly with an active vent may provide a rate of venting during a collision event with a long duration load case that differs from that provided by embodiments lacking one or more active vents. For example, as illustrated in FIG. 6C, once an active vent closes (at point 503), venting is low (i.e., inflation gas is largely retained) until the airbag cushion encounters a restraint load (at line 504), such as an occupant's contact with the airbag cushion. When the occupant strikes the airbag cushion, the venting rate may increase. Embodiments having one or more active vents may use less gas and/or energy than embodiments lacking such vents during deployment. By way of illustration, the graph provided in FIG. 6C illustrates energy wasted by a standard design relative to a design with one or more active vents. The wasted energy is energy expended to maintain inflation of the airbag at a level to provide sufficient restraint of an occupant. The active vent retains inflation gas until venting is needed, and is thus more efficient with the input energy from the inflator. In short, embodiments including active vents such as those described herein may require less input energy to match the crash output energy, thereby enabling the use of smaller inflators. Moreover, in long duration load cases, the wasted energy/gas of the standard design is more noticeable. A standard vent would typically have insufficient gas remaining to provide adequate restraint in a long duration load case.

Other embodiments may differ in some respects from those shown in the drawings. For example, in some embodiments, the patch may be shaped differently and/or may be attached to the airbag cushion in a variety of different ways. For example, in various embodiments, the patch may be triangular, square, rectangular, circular, hexagonal, or any other suitable shape. In various embodiments, the patch may be attached to the cushion at two or more, three or more, or four or more attachment regions (e.g., via stitches at two, three, or four or more positions). In some embodiments, the patch may be shaped as a square, and in further embodiments, a length of each side of the square may be greater than a diameter of the aperture. The square patch may, in some embodiments, be attached to the airbag cushion at only its four corners, which can allow gas to vent outwardly from the airbag cushion in four directions (as opposed to the two directions shown in the drawings). In other embodiments, the patch may be triangular and may only be attached at the three corners. Inflation gas may be permitted to vent in three directions (e.g., between three sets of adjacent stitched areas) when the patch is spaced from the aperture when the active vent is open.

In some embodiments, different arrangements of the various tethers are possible. For example, in some embodiments, one or more of the various tethers may include two or more discrete pieces. More particularly, in some embodiments, one control tether piece is attached to the patch at one end and a second tether piece is attached to an occupant tether at the opposite end. Coupling of one control tether piece to the patch may be a direct attachment (e.g., an end of the control tether may be stitched to the patch), whereas coupling of the another control tether piece to the occupant tether may be an indirect attachment (e.g., an end of the tether may be stitched to an intermediate piece of material that is stitched to a side panel).

Reference throughout this specification to "an embodiment" or "the embodiment" means that a particular feature, structure, or characteristic described in connection with that embodiment is included in at least one embodiment. Such references, as recited throughout this specification, are not necessarily all referring to the same embodiment.

Similarly, it should be appreciated that in the above description of embodiments, various features are sometimes grouped together in a single embodiment, figure, or description for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows in the claims.

We claim:

1. An airbag assembly comprising:
   an airbag cushion defining an inflatable chamber, the airbag cushion comprising a front panel, a rear panel, a first side panel, and a second side panel;
   a first active vent comprising
      a first aperture defined by the first side panel; and
      a first patch attached to the first side panel at an exterior of the airbag cushion;
   a first occupant tether attached to the front panel and the rear panel, the first occupant tether configured to transition from a slack condition to a taut condition as the airbag cushion expands during deployment and to transition from the taut condition to the slack condition as an occupant strikes the airbag cushion;
   a first control tether comprising a first portion and a second portion, wherein the first portion is coupled to the first patch, and the second portion is coupled to the first occupant tether, and
   a cross tether that is separate from the first control tether, the cross tether extending from the first side panel to the second side panel, wherein the cross tether restricts expansion of the airbag cushion during deployment along a first dimension;
   wherein the first control tether is configured to transition from a slack condition to a taut condition as the airbag cushion expands during deployment to draw the first patch toward the first aperture from a first position to a second position, the first patch obstructing venting through the first aperture to a greater extent when the patch is in the second position than when the patch is in the first position;
   wherein the first control tether is further configured to transition from a taut condition to a slack condition as the occupant strikes the airbag cushion, thereby causing lateral deflection of a portion of the first patch such that the deflected portion of the first patch is disposed lateral of the cross tether.

2. The airbag assembly of claim 1, wherein the first side panel is disposed opposite the second side panel.

3. The airbag assembly of claim 2, further comprising:
   a second active vent comprising
      a second aperture defined by the second side panel; and
      a second patch attached to the second side panel at an exterior of the airbag cushion;
   a second occupant tether extending from the front panel of the airbag cushion to the rear panel of the airbag cushion, the second occupant tether configured to transition from a slack condition to a taut condition as the airbag cushion expands during deployment and to transition from the taut condition to the slack condition as an occupant strikes the airbag cushion;
   a second control tether comprising a first portion and a second portion, wherein the first portion of the second control tether is coupled to the second patch, and the second portion of the second control tether is coupled to the second occupant tether;
   wherein the second control tether is configured to transition from a slack condition to a taut condition as the airbag cushion expands during deployment to draw the second patch toward the second aperture from a first position to a second position, the second patch obstructing venting through the second aperture to a greater extent when the second patch is in the second position than when the second patch is in the first position.

4. The airbag assembly of claim 3, wherein the first occupant tether and the second occupant tether are horizontally aligned.

5. The airbag assembly of claim 3, wherein the rear panel comprises an inflation aperture that is configured to be coupled with an inflator.

6. The airbag assembly of claim 3, wherein the first side panel is a left-side panel and the second side panel is a right-side panel.

7. The airbag assembly of claim 3, wherein the first side panel is a top panel and the second side panel is a bottom panel.

8. The airbag assembly of claim 3, wherein the first and second control tethers are configured to slacken due to slackening of the first and second occupant tethers when an occupant strikes the airbag cushion.

9. The airbag assembly of claim 3, wherein drawing the first patch toward the first aperture and drawing the second patch toward the second aperture decreases the venting capacity of the airbag assembly.

10. The airbag assembly of claim 3, wherein the first occupant tether and the second occupant tether are depth-delimiting tethers.

11. The airbag assembly of claim 1, wherein the first control tether is configured to pull a portion of the first patch through the first aperture toward an interior of the airbag cushion as the cushion expands during deployment, thereby transitioning the first active vent to a closed state.

12. The airbag assembly of claim 1, wherein the first control tether is configured to slacken as an occupant strikes the airbag cushion, thereby transitioning the active vent from a closed state to an open state to facilitate occupant ride-down.

13. The airbag assembly of claim 1, wherein the first control tether is configured to transition to the taut condition as a distance between the first patch and the first occupant tether increases during deployment.

14. The airbag assembly of claim 1, wherein the first control tether is configured to remain in a slack condition throughout deployment of the airbag assembly when the occupant is in an out-of-position condition.

15. The airbag assembly of claim 14, wherein the first active vent does not transition from the first position to the second position during deployment of the airbag assembly when the occupant is in an out-of-position condition.

16. The airbag assembly of claim 1, wherein slackening of the first control tether as the occupant strikes the airbag cushion allows the first control tether to extend through the first aperture.

17. The airbag assembly of claim 1, wherein, when the active vent is in an open state, at least a portion of the first patch is spaced from the first side panel to permit the egress of inflation gas from the airbag cushion through the first aperture.

18. The airbag assembly of claim 1, wherein the first patch is attached to the exterior of the second panel by two seams, a first seam adjacent a first side of the first aperture and a second seam adjacent a second side of the first aperture.

19. The airbag assembly of claim 1, wherein transitioning the first control tether from the slack condition to the taut condition closes the first active vent by inverting the first patch from a configuration in which the first patch bows outwardly away from the airbag cushion to a configuration in which the first patch bows inwardly to plug the first aperture.

20. An airbag assembly comprising:
an airbag cushion that defines a cavity into which inflation gas can be received to inflate the airbag cushion, wherein the airbag cushion comprises a front panel, a rear panel, a first side panel, and a second side panel disposed opposite the first side panel;
a first active vent that comprises:
a first aperture defined by the first side panel; and
a first patch attached to the first side panel at an exterior of the airbag cushion; and
a first depth-delimiting tether attached to an interior of the front panel and extending to attach to an interior of the rear panel and coupled to the first patch, the first depth-delimiting tether configured to transition from a slack condition to a taut condition when the airbag cushion expands during deployment to close the first active vent the first depth-delimiting tether also configured to transition from the taut condition to the slack condition as an occupant strikes the airbag cushion to allow the first active vent to open;
a first control tether extending from the first patch to the first depth-delimiting tether to couple the first depth-delimiting tether to the first patch; and
a cross tether that is separate from the first control tether, the cross tether extending from the first side panel to the second side panel, transverse to the first depth delimiting tether, the cross tether restricting expansion of the airbag cushion during deployment along a dimension other than a depth dimension;
wherein the first control tether is configured to transition from a slack condition to a taut condition when the airbag cushion expands during deployment to close the first active vent by causing the first patch to interact with a portion of the first panel that defines the first aperture in a manner that prevents or inhibits inflation gas from exiting from an interior of the airbag cushion via the first aperture, and the first control tether is configured to transition from the taut condition to the slack condition when an object or person strikes the front panel of the airbag cushion, thereby opening the first active vent due to lateral deflection of a portion of the first patch such that the deflected portion of the first patch is disposed lateral of the cross tether.

21. The airbag assembly of claim 20, further comprising:
a second active vent that comprises:
a second aperture defined by the second side panel; and
a second patch attached to the second side panel at an exterior of the airbag cushion,
wherein the first depth-delimiting tether is coupled to the second patch,
wherein the first depth-delimiting tether comprises a slit extending along a portion of a length of the first depth-delimiting tether to divide the first depth-delimiting tether into a first occupant tether and a second occupant tether,
wherein the first occupant tether is coupled to the first patch and the second occupant tether is coupled to the second patch.

22. The airbag assembly of claim 20, further comprising:
a second active vent that comprises:
a second aperture defined by the second side panel; and
a second patch attached to the second side panel at an exterior of the airbag cushion; and
a second depth-delimiting tether attached to an interior of the front panel and extending to attach to an interior of the rear panel and coupled to the second patch, the second depth-delimiting tether configured to transition from a slack condition to a taut condition when the airbag cushion expands during deployment to close the second active vent by causing the second patch to interact with a portion of the second side panel that defines the second aperture in a manner that prevents or inhibits inflation gas from exiting from an interior of the airbag cushion via the second aperture, the second depth-delimiting tether also configured to transition from the taut condition to the slack condition as an occupant strikes the airbag cushion to allow the second active vent to open.

* * * * *